United States Patent
Enke

(10) Patent No.: US 10,198,841 B2
(45) Date of Patent: Feb. 5, 2019

(54) MAP VIEW

(71) Applicant: GoPro, Inc., San Mateo, CA (US)

(72) Inventor: Joseph Anthony Enke, San Francisco, CA (US)

(73) Assignee: GoPro, Inc., San Mateo, CA (US)

(*) Notice: Subject to any disclaimer, the term of this patent is extended or adjusted under 35 U.S.C. 154(b) by 107 days.

(21) Appl. No.: 15/365,697

(22) Filed: Nov. 30, 2016

(65) Prior Publication Data

US 2018/0150984 A1 May 31, 2018

(51) Int. Cl.
| | | |
|---|---|---|
| *G06K 9/00* | (2006.01) | |
| *G06T 11/60* | (2006.01) | |
| *G06T 5/00* | (2006.01) | |
| *B64C 39/02* | (2006.01) | |
| *B64D 47/08* | (2006.01) | |

(52) U.S. Cl.
CPC ............ *G06T 11/60* (2013.01); *B64C 39/024* (2013.01); *B64D 47/08* (2013.01); *G06T 5/006* (2013.01); *G06T 2207/30244* (2013.01); *G06T 2207/30248* (2013.01)

(58) Field of Classification Search
CPC combination set(s) only.
See application file for complete search history.

(56) References Cited

U.S. PATENT DOCUMENTS

| | | | | |
|---|---|---|---|---|
| 2008/0312871 | A1* | 12/2008 | Salcedo | G05B 15/02 702/179 |
| 2009/0115783 | A1* | 5/2009 | Eichenlaub | G02B 27/2221 345/421 |
| 2011/0001826 | A1* | 1/2011 | Hongo | B60R 1/00 348/148 |
| 2012/0154599 | A1* | 6/2012 | Huang | H04N 5/232 348/169 |
| 2016/0026865 | A1* | 1/2016 | Reynolds, Jr. | G06K 9/00624 382/103 |
| 2016/0349746 | A1* | 12/2016 | Grau | G05D 1/0094 |
| 2018/0025649 | A1* | 1/2018 | Contreras | G08G 5/006 |

\* cited by examiner

*Primary Examiner* — Jerome Grant, II
(74) *Attorney, Agent, or Firm* — Young Basile Hanlon & MacFarlane, P.C.

(57) ABSTRACT

A mapping system receives sensor data from an unmanned aerial vehicle. The mapping system further receives images from a camera of the unmanned aerial vehicle. The mapping system determines an altitude of the camera based on the sensor data. The mapping system calculates a footprint of the camera based on the altitude of the camera and a field of view of the camera. The mapping system constructs a localized map based on the images and the footprint of the camera.

18 Claims, 9 Drawing Sheets

MAP VIEW

TECHNICAL FIELD

The disclosure generally relates to the field of mapping, for example constructing a localized map from images and sensor data.

BACKGROUND

Traditional aerial vehicles include geographic maps including image data for the Earth, or particular region thereof. The geographic maps may be pre-loaded or may be downloaded in real-time. For example, an aerial vehicle may pre-load vector maps of the earth, or particular region thereof, and may download image data in real-time during operation as needed. However, often times the geographic maps may not be able to be pre-loaded nor be downloaded in real-time.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
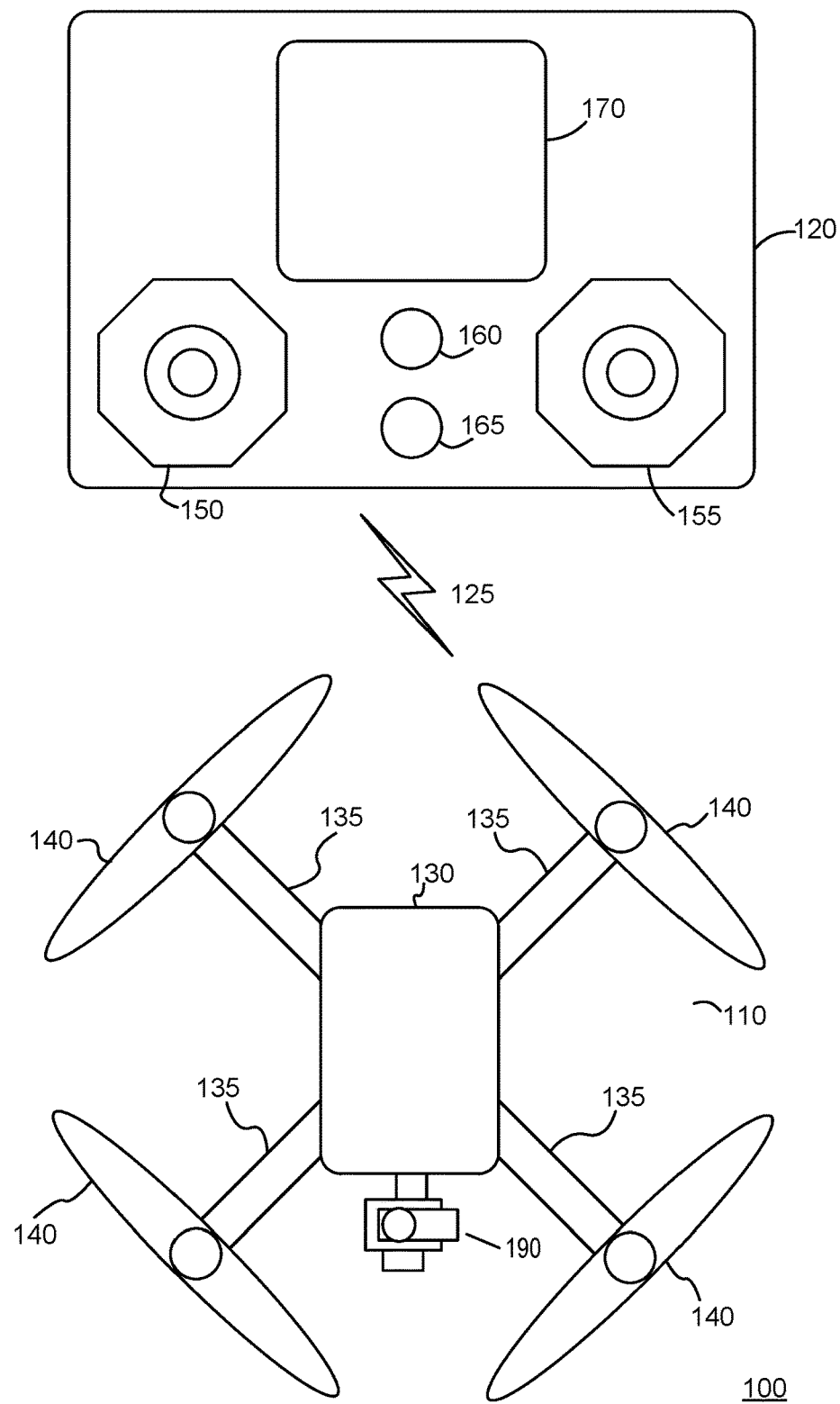
FIG. 1 illustrates an example configuration of a remote controlled aerial vehicle in communication with a remote controller, according to one example embodiment.

The Figures (FIGS.) and the following description relate to preferred embodiments by way of illustration only. It should be noted that from the following discussion, alternative embodiments of the structure and methods disclosed herein will be readily recognized as viable alternatives that may be employed without departing from the principles of what is claimed.

Reference will now be made in detail to several embodiments, examples of which are illustrated in the accompanying figures. It is noted that whenever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A mapping system receives sensor data from an unmanned aerial vehicle. The sensor data may include global positioning data and barometric data. The mapping system further receives images from a camera of the unmanned aerial vehicle. The mapping system determines an altitude of the camera based on the sensor data. The altitude of the camera may be a distance between the camera and a surface of the earth. The mapping system calculates a footprint of the camera based on the altitude of the camera and a field of view (FOV) of the camera. The FOV of the camera may be an extent of the earth captured by the camera. The FOV may include a horizontal component and a vertical component. The mapping system constructs a localized map based on the images and the footprint of the camera.

In some configurations, determining the footprint of the camera may include determining a length of the footprint of the camera based on the horizontal component of the FOV of the camera, and determining a width of the footprint of the camera based on the vertical component of the FOV of the camera.

In some configurations, the mapping system may further de-warp the images including distortion correction and/or chromatic aberration correction.

In some configurations, the mapping system may further determine a position of the camera relative to an initial position of the camera, where the initial position is associated with the sensor data used to determine the altitude of the camera and the images used to construct the localized map.

In some configurations, the mapping system may further overlay the localized map on a vector map, wherein the vector map includes one or more of road networks, railroad networks, airports, elevation contours, coastlines, boundaries, and index of geographical names An aerial vehicle may include an onboard camera and one or more onboard sensors. The aerial vehicle may use the camera to capture one or more images during flight and may construct a localized map using the captured images. The localized map may be used when geographic maps may not be pre-loaded or may not be downloaded in real-time. Thus, the localized map may mimic satellite imagery. In some configurations, the localized map may be used in addition to the geographic map and/or vector maps.

Example System Configuration

The descriptions herein are in the context of a remote controlled aerial vehicle (or drone), for example, a rotary wing (or rotary blade), such as a quadcopter, or fixed wing aircraft. However, disclosed configurations may apply to other remote controlled vehicles such as boats and cars. In addition, the remote controlled vehicles may have hobby sized form factors. Remote control aerial vehicles may sometimes be referred to as unmanned aerial vehicles (UAVs) or drones and in this context may include camera units/hardware for capturing content (e.g., images and/or videos).

Turning now to FIG. 1, it illustrates an example aerial capture platform (or system) 100. The aerial capture platform 100 may include a remote controlled aerial vehicle 110 in communication with a remote controller 120. The aerial vehicle 110 and the remote controller 120 may be communicatively coupled through a wireless link 125. The wireless link 125 may be a Wi-Fi link, cellular (e.g., long term evolution (LTE), 3G, 4G, 5G) or other wireless communication link. In this example, the aerial vehicle 110 is illustrated as multi-rotary blade aerial vehicle. Here, the multi-rotary blade aerial vehicle is illustrated with four rotary blades, and thus, also may be referenced as a quadcopter. Also in this example, the remote controller 120 is illustrated as a dedicated remote controller, but the principles described herein may apply to other devices that may operate as a remote controller, for example, a smartphone, tablet, and/or a laptop.

The aerial vehicle 110 in this example includes a housing (or body) 130, a gimbal 190, two or more arms 135, and two or more propellers 140. The housing 130 may have one or more cavities for a payload. The payload may include, for example, electronic circuitry (e.g., controls and processing components), batteries and/or sensors. The payload may include mechanisms such as a parachute. The parachute may be in a portion of the housing 130 that may open so that the parachute may deploy in certain pre-determined situations. The parachute and/or corresponding portion of the housing 130 may couple with electronics that may provide the logic for deployment of the parachute. The housing 130 may include a communication subsystem (which may include corresponding electronics and/or firmware) and a control subsystem (which may include corresponding electronics and/or firmware). The communication subsystem may be used to wirelessly communicate with a remote controller (e.g., the remote controller 120) or other interfaces on the aerial vehicle 110. The control subsystem may be used/configured to control operations of various systems on the aerial vehicle 110, for example, a power system, a flight operation system and other such systems. The communication subsystem and the control subsystem are described further in detail with respect to FIG. 2.

The gimbal 190 may be a removable structure. For example, the gimbal 190 may removably (or releasably) mount within an opening on the housing 130 of the aerial vehicle 110. Alternately, the gimbal 190 may be integrated with the housing 130. Further by example, when removed from the aerial vehicle 110, the gimbal 190 may be mounted on another structure, for example, a pole mount. The gimbal 190 may couple with a removable camera frame. The camera frame may be removed and fitted for a particular camera that couples with it. Alternately, the camera frame may be integrated with the gimbal 190. The gimbal 190 also may include a camera secured directly with it or through the camera frame.

Each arm 135 of the aerial vehicle 110 may removably couple with the housing 130. In addition, each arm 135 is movable and may fold toward the housing 130 when the aerial vehicle 110 is not operational for flight and may fold back away from the housing 130 when the aerial vehicle is operational for flight. In addition, each arm 135 includes a thrust motor (which may include a rotor) that may mechanically, and removably, couple with a propeller 140 to create a rotary assembly. The thrust motor spins the propeller 140 in an appropriate direction to allow the aerial vehicle 110 to move based on command that is executed. For example, when the rotary assembly is operational, all the propellers 140 spin in appropriate directions and/or at speeds to allow the aerial vehicle 110 to lift (take off), tilt, turn, land, hover, and/or otherwise move (up, down, forward, reverse (or backward), etc.) in flight. In addition the aerial vehicle 110 may include landing gear (not shown) on an underside of the housing 130. The landing gear may be configured to fold toward the housing 110 when the aerial vehicle 110 is in flight. The landing gear may extend outward away from the housing 110 when the aerial vehicle 110 is at rest on a surface.

Example Electronics and Control System for Aerial Vehicle

Figure 2:
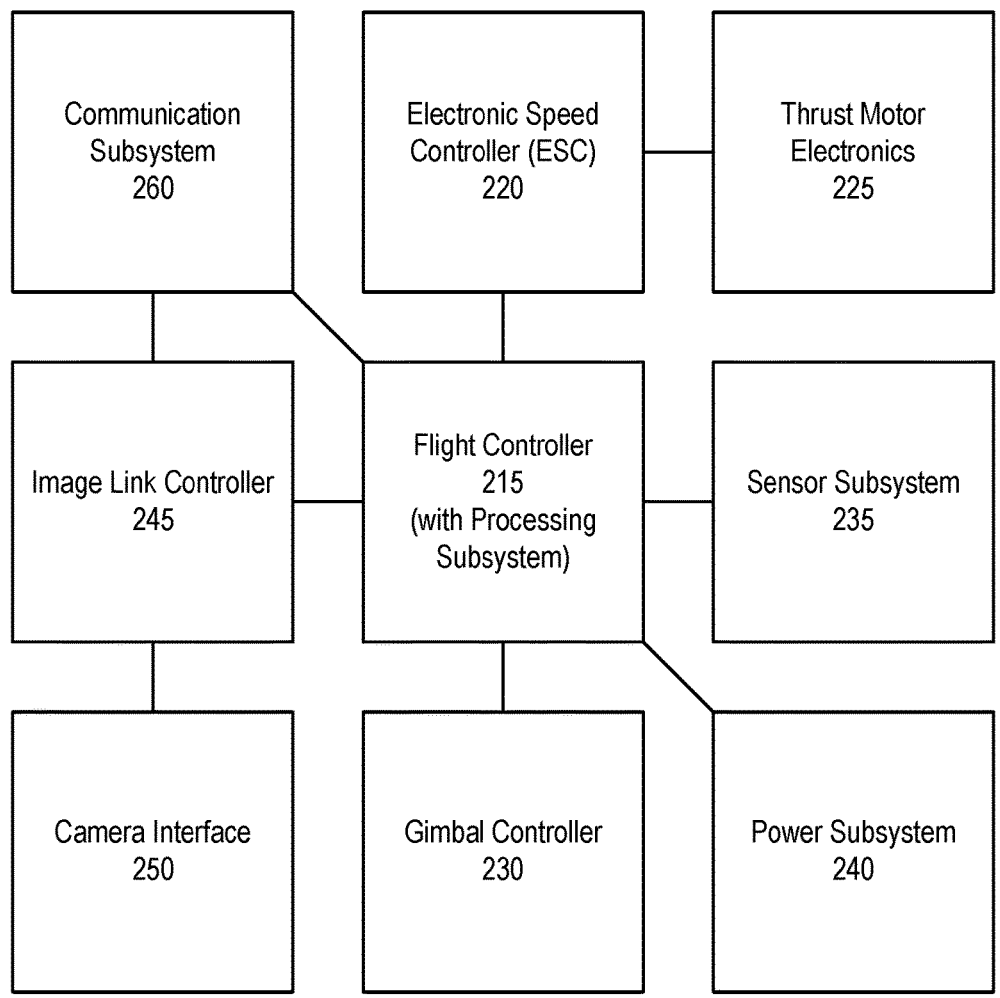
FIG. 2 illustrates an example of aerial vehicle electronics and control systems, according to one example embodiment.

FIG. 2 illustrates an example embodiment of an electronics and control (EC) system 210 of the aerial vehicle 110, according to one example embodiment. The example EC system 310 may include a flight controller 215, an electronic speed controller (ESC) 220, one or more thrust motors electronics 225, a gimbal controller 230, a sensor subsystem (which may include telemetric subsystems) 235, a power subsystem 240, an image link controller 245, a camera interface 250, and a long range communication subsystem 260. The components communicate directly or indirectly with each other through a data bus within the aerial vehicle 110.

Figure 9:
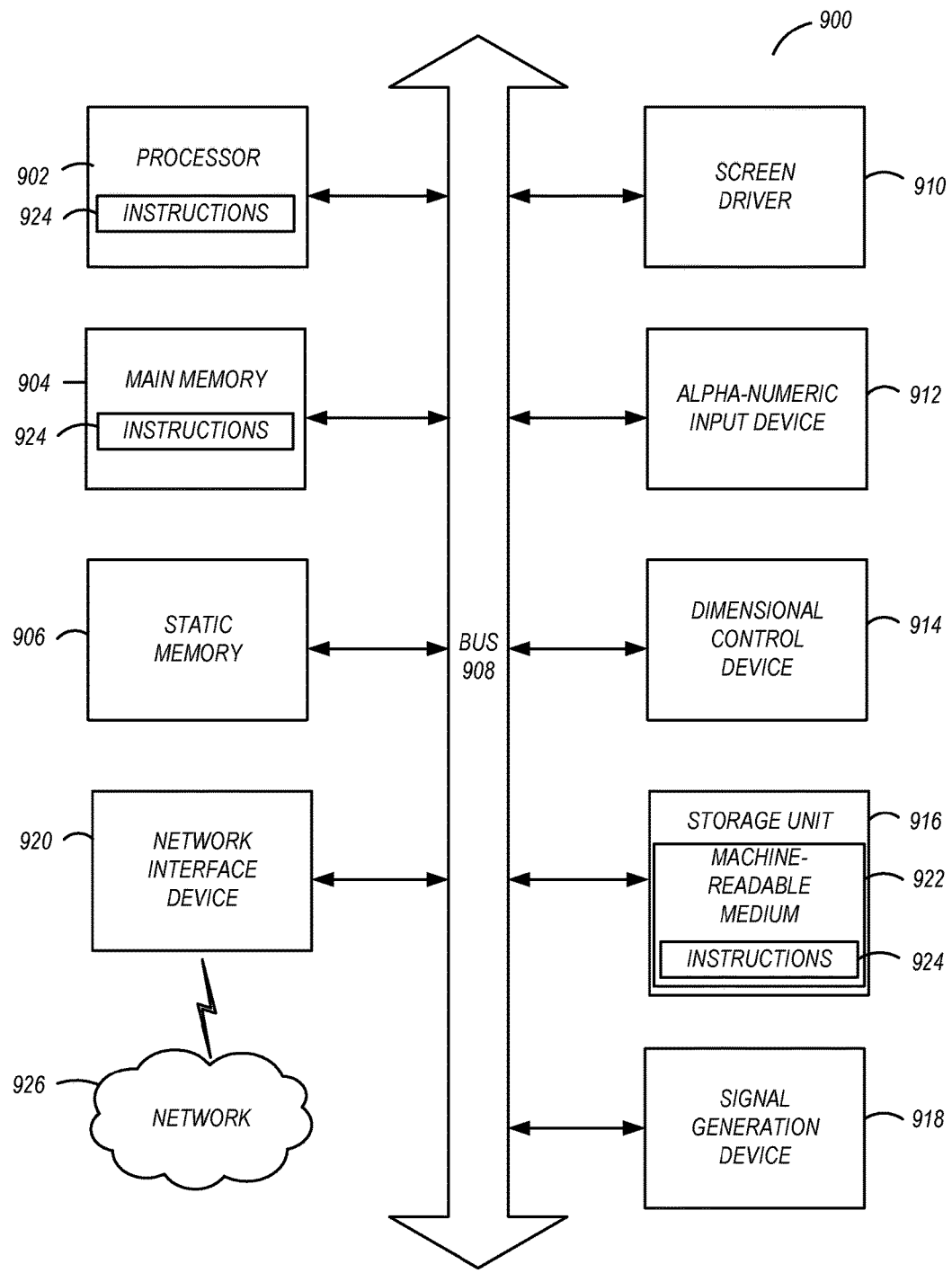
FIG. 9 illustrates an example machine for use with a system of an aerial vehicle, according to one example embodiment.

The aerial vehicle 110 components may be embodied in hardware, software, or a combination thereof. The software, which may include firmware, may be referenced as program code, computer program product, or program instructions, and may be comprised of one or more instructions. Software may include an operating system, which provides an interface to a processor, and on which software applications run (or execute). Software may be executed by one or more processors within the aerial vehicle 110. A processor also may include, for example, controllers, application specific integrated circuits (ASICs) and/or field programmable gate arrays (FPGAs). The processor may be configured to execute the software in a specific manner. FIG. 9 provides an example machine architecture with a processor that may be configured to execute software. It is noted that not all the components of FIG. 9 may be included in the aerial vehicle 110. FIG. 9 is intended to be illustrative in describing an architecture of a computing system, of which all or parts may operate within the aerial vehicle 110 and the EC system 210.

In this example, the aerial vehicle 110 may be configured to include an aerial vehicle operating system (AVOS). By way of example, the AVOS may be built on an operating system kernel, for example, LINUX, and/or be based on an operating system such as ANDROID OS. The software components of aerial vehicle described in the disclosure operate with the AVOS.

Turning now to the example components of the EC system 210, a further description of each component is provided. In one example embodiment, the flight controller 215 of the EC system 210 coordinates and processes software for the aerial vehicle 110. The flight controller 215 may integrate the AVOS. Examples of processing directed by the flight controller 215 include coordinating communication with the remote controller 120 through the communication subsystem 260 and processing commands to and from the remote controller 120. The flight controller 215 may also control flight related operations of the aerial vehicle 110 by control over the other components such as the ESC 220 and the sensor subsystem 235. The flight controller 215 may also interface with the gimbal controller 230 to assist with controlling the motors of the gimbal 190. In addition, the flight controller 215 may be used to assist with the image link 245 for camera control operations. The flight controller 215 may also interface with the power subsystem 240 to manage and supply power to the components of the EC system 210.

Referring now to the ESC 220, it may be configured to interface with the thrust motors electronics 225. The ESC 220 may be configured to control, via the thrust motors electronics 225, the speed applied by thrust motors in the arms 135 to the propellers 140. The ESC 220 may control each thrust motor through the thrust motors electronics 225 individually or in groups or subgroups. It is noted that the thrust motors electronics 225 may be integrated with the thrust motors.

Next, the gimbal controller 230 may include control electronics (and may include firmware) that may be configured to control operation of the motors for each axis of the gimbal 190. The gimbal controller 230 may receive commands via the flight controller 215. The commands may originate from the remote controller 120, which passes them to the flight controller 215 via the communication subsystem 260.

The gimbal controller 230 may be communicatively coupled with the camera through one or more camera interface connectors. The camera interface connectors may include camera communication interfaces such as Universal Serial Bus (USB) or High Definition Multimedia Interface (HDMI). The images and/or videos captured by the camera may be communicated (transmitted) to the aerial vehicle 110 through the camera interface connectors and a gimbal interface. The transmission of the images may be at a high (or full) resolution (e.g., uncompressed) or at a lower (partial) resolution (e.g., compressed). Data (e.g., sensor data from the sensor data subsystem 235) also may be sent via the camera interface connectors to the camera to associate with the images and/or videos captured and stored on/by the camera.

Turning next to the image link controller 245, it may be configured to communicate with the camera interface 250 to transmit commands that may include capture of content (e.g., images and/or videos) from a camera for transmission to the remote controller 120 (and/or other devices with a screen, such as a smart phone or tablet), for example, via the communication subsystem 260. The content may be overlaid and/or augmented with other data from the aerial vehicle 110 such as sensor data from the sensor subsystem 235. When content is sent to both the remote controller 120 and another device, the overlaid information may be the same on each device or distinct on each device. It is noted that the image link controller 245 may have a processing configuration that allows commands to be directly transmitted between the communication subsystem 260 and the camera interface 250. Alternately, or in addition, the image link controller 245 may communicate with the flight controller 215 for processing resources and application of software configurations.

The camera interface 250 may be configured to receive camera control commands from the image link controller 245. The camera control commands may include commands to set up camera operations, e.g., frame capture rate, content type (e.g., image or video), and the like. The camera control commands may originate from the remote controller 120 and may be received via the communication subsystem 260 and image link controller 245 of the EC system 210.

Turning next to the sensor subsystem 235, it may include one or more sensors. One or more sensors may be further grouped as sensor modules to gather particular types of data. For example, one sensor module may be for positional sensors and another sensor module may be for environmental sensors. Positional sensors may provide location and/or relative location in space and orientation information of the aerial vehicle 110. Positional sensors may assist with navigation and location related operations of the aerial vehicle 110. Positional sensors may include, for example, gyroscopes, accelerometers, compasses, global positioning system (GPS) sensors, motion sensors, and/or altimeters. Environmental sensors may provide information of a particular environment. For example, environmental sensors may provide information on environmental conditions external to the housing 130 of the aerial vehicle 110. Further by example, environmental sensors may provide information on conditions within the housing 130 of the aerial vehicle 110. Environmental sensors may include, for example, temperature sensors, photodetectors, heat sensors, moisture sensors, and/or barometric sensors. It is noted that in some example instances an environmental sensor may also operate as a positional sensor for purposes of how the data may be used and vice versa. For example, a photodetector may be used to determine time of day for a flight, but also may be used to detect shadows for avoidance detection during flight of the aerial vehicle 110. Similarly by way of example, a barometric sensor may be used to determine atmospheric pressure and aerial vehicle 110 altitude. Note that other sensor configurations also may be included in addition to the examples given.

The sensor data from the sensor subsystem 235 may include sensor metadata and may be integrated with images and/or metadata from a camera. The images from the camera, which may also include additional metadata, may be transmitted wirelessly to other devices and/or stored for later playback. When the images are displayed (e.g., played in real time or from storage), the sensor data may be extracted from it and provided for display on a screen, e.g., the screen 170 of the remote controller 120 or a screen of a computing device (e.g., laptop, smartphone, tablet, and/or desktop computer). The camera interface 250 may interface with a camera or may include an integrated camera.

The power subsystem 240 may be configured to manage and supply power to the components of the EC system 210. The power subsystem 240 may include a battery pack and a protection circuit module as well as a power control/battery management system. The battery may be replaceable and/or rechargeable. The battery of the power subsystem 240 may be configured to charge the camera in flight as needed or pre-flight. Other devices also may be charged using the energy capacity of the battery of the power subsystem 240, for example, the remote controller 120, a powered handheld grip, or a mobile phone. The battery may also be used to charge the camera, or other devices, post-flight, depending on energy remaining in the battery. Further, the power subsystem 240 may be configured to include a dual power path. A first path allows for a first power level, e.g., low current, to be used to power up the aerial vehicle 110 and its onboard components. Once components are powered, the aerial vehicle 110 may transition to a second power level, e.g., high current, which is sufficient to consistently drive the thrust motors and onboard components during flight. In addition, a regenerative charging configuration may be integrated into the power subsystem 240. For example, the power subsystem 240 may include a recharge circuit electrically coupled with the thrust motors so that when the thrust motors are decelerating, current is pushed back through the recharge circuit to charge the battery of the power subsystem 240.

The communication subsystem 260 may include communication electronics (and may include corresponding firmware) for the aerial vehicle 110. For example, the communication subsystem 260 may include a long range WiFi system. It may further include additional wireless communication components. For example, it may include another WiFi system, which may allow for one WiFi system to be dedicated to direct control communications with the remote controller 120 and the other WiFi system may be used for other communications, such as image transmissions. It may include a communication system such as one based on long term evolution (LTE), 3G, 4G, 5G or other mobile communication standard. The communication subsystem 260 may be configured with a unidirectional remote control channel for communication of controls from the remote controller 120 to the aerial vehicle 110 and a separate unidirectional channel for an image downlink from the aerial vehicle 110 to the remote controller 120 (or to a video receiver where direct image connection may be desired). The communication subsystem 260 may be used to allow for other services, for example, to provide over the air or hardwire link updates, such as firmware updates to the aerial vehicle 110. Some third-party services may be provided access to the communication subsystem 260 or components within via application programming interfaces (API).

Example Camera Architecture

Figure 3:
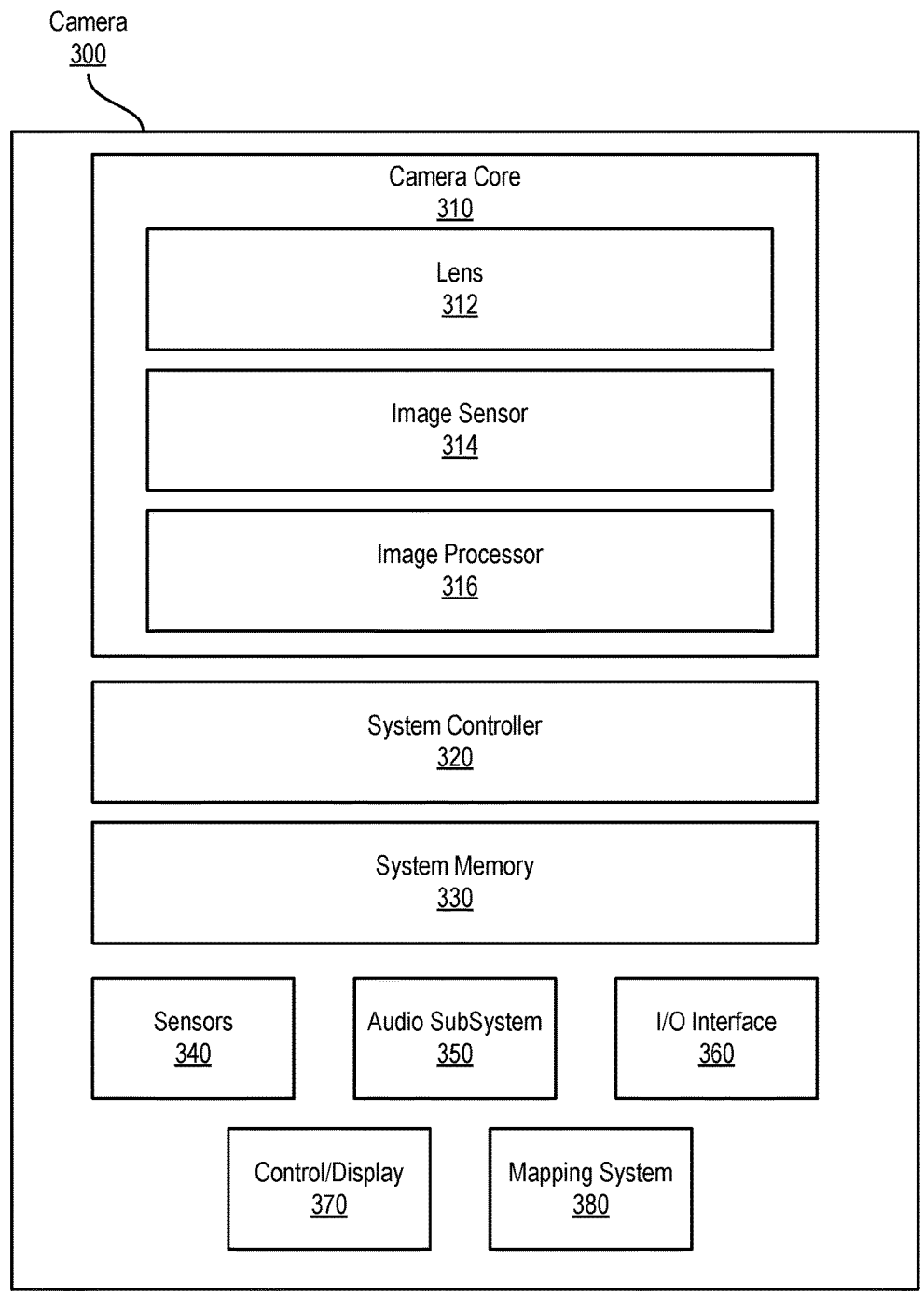
FIG. 3 illustrates a block diagram of an example camera architecture, according to one example embodiment.

FIG. 3 illustrates a block diagram of an example camera architecture 305, according to one example embodiment. The example camera architecture 305 may be an architecture for a camera 300. It is noted that the camera 300 may be independent of or integrated with the aerial vehicle 110. When integrated with the aerial vehicle 110, the camera 300 may also be integrated with a gimbal (e.g., the gimbal 190). Alternately, when independent, the camera 300 may be removably attached to the aerial vehicle 110. When removably attached, the camera 300 may be removably coupled to the gimbal 190 that couples the aerial vehicle 110. As previously noted, the gimbal 190 may be removably coupled with the aerial vehicle 110. Alternatively, the gimbal 190 may be integrated with the aerial vehicle 110. For ease of discussion, the camera 300 is described in a configuration where it is removably coupled with the gimbal 190 via a camera mount and the gimbal 190 also is removably coupled with the aerial vehicle 110. However, the principles noted apply also in the instances in which the camera 300 is integrated with the aerial vehicle 110.

Referring briefly to the camera 300 itself, it can include a camera body, one or more a camera lenses, various indicators on the camera body (e.g., LEDs, displays, and the like), various input mechanisms (e.g., buttons, switches, touch-screen mechanisms, and the like), and electronics (e.g., imaging electronics, power electronics, metadata sensors, and the like) internal to the camera body for capturing images and/or videos via the one or more lenses and/or performing other functions.

In one embodiment, the camera 300 is capable of capturing spherical or substantially spherical content. As used herein, spherical content may include images or videos having spherical or substantially spherical field of view. For example, in one embodiment, the camera 300 captures content having a 360 degree field of view in the horizontal plane and a 180 degree field of view in the vertical plane. Alternatively, the camera 300 may capture substantially spherical content having less than 360 degrees in the horizontal direction and less than 180 degrees in the vertical direction (e.g., within 10% of the field of view associated with fully spherical content). In other embodiments, the camera 300 may capture content having a non-spherical wide angle field of view.

The camera 300 may include sensors to capture metadata associated with content data, such as timing data, motion data, speed data, acceleration data, altitude data, GPS data, and the like. In one example embodiment, location and/or time centric metadata (geographic location, time, speed, etc.) can be incorporated into a content file together with the captured content in order to track over time the location of the camera 300 or the subject being recorded by the camera 300. The metadata associated with the content data and the sensor metadata may be captured by the camera 300 itself or by another device proximate to the camera 300 (e.g., a mobile phone, a data tracker worn by a subject (e.g., a smart watch or fitness tracker equipped with tracking software or a dedicated radio frequency tracker), the aerial vehicle 110 via the camera interface, and the like).

In one embodiment, the metadata may be incorporated with a content stream by the camera 300 as the content is being captured. In another embodiment, a metadata file separate from the content file may be captured (by the same capture device or a different capture device) and the two separate files can be combined or otherwise processed together in post-processing.

It is noted that these sensors may be in addition to the sensors of the sensor subsystem 235. In embodiments in which the camera 300 is integrated with the aerial vehicle 110, the camera 300 need not have (or need not operate) separate individual sensors, but rather could rely upon the sensors integrated with the aerial vehicle 110. The data captured by the sensors may be referenced as sensor metadata. The sensor metadata, as well as camera metadata from the camera 300, may be integrated with and/or used with aerial vehicle metadata captured from sensors on the aerial vehicle 110, for example, the environmental sensors, positional sensors, and the like.

Referring now to the example camera architecture 305 of the camera 300, it may include a camera core 310, a system controller 320, a system memory 330, sensors 340, audio subsystems 350, an I/O interface 360, a control/display 370, and/or a mapping system 380. The camera core 310 may include a lens 312, an image sensor 314, and an image processor 316. The system controller 320 (e.g., a microcontroller or microprocessor) may control the operation and functionality of the camera 300 and the system memory 330 may be configured to store executable computer instructions that, when executed by the system controller 320 and/or the image processor 316, perform the camera functionalities described herein. In some embodiments, the camera 300 may include multiple camera cores 310 to capture fields of view in different directions which may then be stitched together to form a cohesive image. For example, in an embodiment of a spherical camera system, the camera 300 may include two camera cores 310 each having a hemispherical or hyper hemispherical lens that each captures a hemispherical or hyper hemispherical field of view which is stitched together in post-processing to form a spherical image.

The lens 312 may be, for example, a wide angle lens, hemispherical, or hyper hemispherical lens that focuses light entering the lens 312 to the image sensor 314 which captures content (e.g., images and/or videos). The image sensor 314 may capture high-definition content having a resolution of, for example, 720 p, 1080 p, 4 k, or higher. In one embodiment, spherical images may be captured as a 5760 pixels by 2880 pixels with a 360 degree horizontal field of view and a 180 degree vertical field of view. The image sensor 314 may capture content at frame rates of, for example, 30 frames per second (fps), 60 fps, 120 fps or higher.

The image processor 316 can perform one or more image processing functions of the captured content. For example, the image processor 316 may perform a Bayer transformation, demosaicing, noise reduction, image sharpening, image stabilization, rolling shutter artifact reduction, color space conversion, compression, or other in-camera processing functions. The image processor 316 also may be configured to perform real-time stitching of images, for example, when images are capture from two or more cameras coupled with the aerial vehicle 110 and configured to capture images. Such example configurations may include, for example, an activity camera (which may include a spherical image capture camera) that captures images, each with a substantially different field of view (FOV), but where there may be some overlap where the images can be stitched together. Processed images may be temporarily or persistently stored to system memory 330 and/or to a non-volatile storage, which may be in the form of internal storage or an external memory card.

Sensors 340 may capture various metadata concurrently with, or separately from, content capture. For example, the sensors 340 may capture time-stamped location information based on a global positioning system (GPS) sensor. Other sensors 340 may be used to detect and capture orientation of the camera 300 including, for example, an orientation sensor, an accelerometer, a gyroscope, an altimeter, or a magnetometer. Sensor data captured from the various sensors 340 may be processed to generate other types of metadata. For example, sensor data from the accelerometer may be used to generate motion metadata, including velocity and/or acceleration vectors representative of motion of the camera 300. Furthermore, sensor data from the aerial vehicle 110 and/or the gimbal 190/gimbal controller 230 may be used to generate orientation metadata describing the orientation of the camera 300. Sensor data from the GPS sensor may provide GPS coordinates identifying the location of the camera 300, and the altimeter measures the altitude of the camera 300. In one embodiment, the sensors 340 may be rigidly coupled to the camera 300 such that any motion, orientation or change in location experienced by the camera 300 is also experienced by the sensors 340. The sensors 340 furthermore may associate one or more time stamps representing when the data was captured by each sensor. In one embodiment, the sensors 340 automatically begin collecting sensor metadata when the camera 350 begins capturing content. As noted previously, the sensor data from the camera architecture 305 may be integrated with and/or used with sensor data from the aerial vehicle 110. It is noted that in example embodiments in which sensors of a particular type are missing from the aerial vehicle 110, the sensors 340 of the camera 300 can provide the requisite sensor data for appropriate processing operations.

The audio subsystem 350 may include, for example, one or more microphones and one or more audio processors to capture and process audio data correlated with the content. In one embodiment, the audio subsystem 350 may include a microphone array having two or microphones arranged to obtain directional audio signals.

An input/output (I/O) interface 360 may transmit and receive data from various external devices. For example, the I/O interface 360 may facilitate the receiving or transmitting content information through an I/O port. Control information, e.g., from/to a gimbal controller 230, also may be transmitted via the I/O interface 360. Examples of I/O ports or interfaces include USB ports, HDMI ports, Ethernet ports, audio ports, and the like. Furthermore, embodiments of the I/O interface 360 may include wireless ports that can accommodate wireless connections. Examples of wireless ports include Bluetooth, Wireless USB, Near Field Communication (NFC), and the like. The I/O interface 360 may also include an interface to synchronize the camera 300 with other cameras or with other external devices, such as a remote control, a second camera, a smartphone, a client device, or a video server. For example, a camera 300 mounted to an aerial vehicle 110 may be synchronized wirelessly (e.g., using time codes) with a camera on another aerial vehicle or on the ground so that content captured by the various cameras can be synchronized.

A control/display subsystem 370 includes various control components associated with operation of the camera 300 including, for example, LED lights, a display, buttons, microphones, speakers, and the like.

The camera 300 may further include a mapping system 380. The mapping system 380 generates a localized map based on image data and sensor data. It is noted that the mapping system 380 may be independent of or integrated in the camera 300. The mapping system 380 is further described with reference to FIG. 4.

The camera 300 may also be controlled remotely, for example, through the remote controller 120, or through other devices in wireless communication with the camera 300, either directly or through the aerial vehicle 110. Accordingly, control functions of the camera 300 may be manipulated before, during or after flight (e.g., at landing). For example, during flight the camera 300 may be configured to switch from capturing content at 30 fps to 60 fps. In this example, an aerial vehicle 110 may follow a skier down a slope and start capturing content through the camera 300 at 30 fps. As the skier accelerates, e.g., for a jump, the camera 300 may automatically switch to capturing content at 60 fps. Also by way of example, if the skier is in the distance (e.g., 20 meters), the camera 300 may being to capture content at 30 fps, but as the aerial vehicle draws closer (e.g., within 5 meters), the camera 300 may automatically switch to capturing content at 60 fps.

Moreover, an operator may seek to switch the camera 300 from capturing content in one mode (e.g., low resolution, low fps, and the like), to capturing content in another mode (e.g., high resolution, high fps, and the like), while the aerial vehicle 110 is in flight and the camera 300 is operational. The positioning of the camera 300 can also be further controlled from an operator on the ground transmitting signals from the remote controller 120 or mobile device to move the camera angle through movement of appropriate gimbal 190 components. Further by example, at landing the camera 300 may be configured to capture content (e.g., to assist with location analysis for locating the aerial vehicle 110).

Example Mapping System

Figure 4:
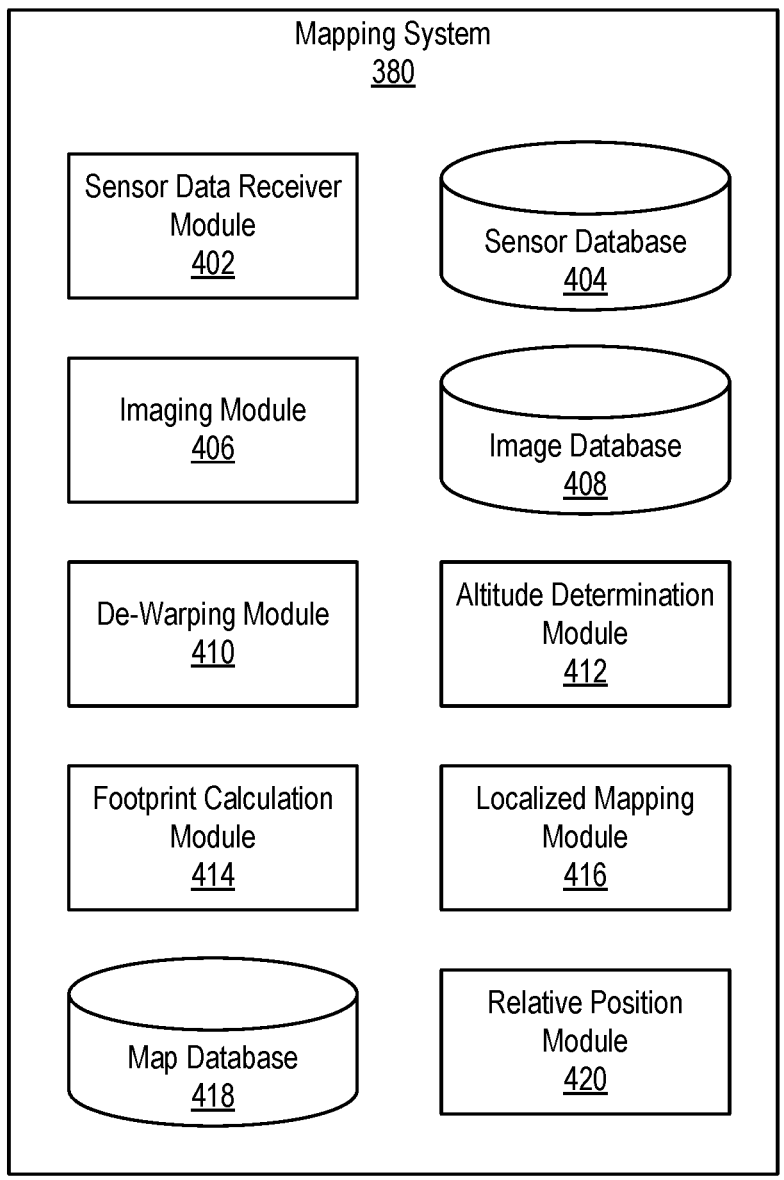
FIG. 4 illustrates a block diagram of an example mapping system, according to one example embodiment.

FIG. 4 illustrates the mapping system 380 for generating a localized map, according to one example embodiment. The mapping system 380 may include processing modules and data stores. The processing modules may include software code executable within a processing system and databases where data is stored and received. The processing modules may interface with the databases. The mapping system 380 may include a sensor data receiver module 402, a sensor database 404, an imaging module 406, an image database 408, a de-warping module 410, an altitude determination module 412, a footprint calculation module 414, a localized mapping module 416, a map database 418, and a relative position module 420.

The sensor data receiver module 402 may be configured to receive sensor data from the sensors 340 of the camera 300 and/or from the sensors of the sensor subsystem 235. The sensor data may include, for example, positional data, motion data, environmental data, and the like. An example of positional data includes positional coordinates captured by positional sensors. Examples of motion data include global positioning data, accelerometer data, gyroscopic data, rotational vector data, and the like. Examples of environmental data include barometric data, temperature data, humidity data, and the like. The sensor data receiver module 402 may be configured to store the received sensor data in the sensor database 404.

The imaging module 406 may be configured to receive images captured by the camera 300. In some configurations, the imaging module 406 may provide instructions to the camera 300 to capture an image. The imaging module 406 may be configured to store the received images in the image database 408. The imaging module 406 may update the image database 408 in real-time so that the images may be updated and utilized in real-time. The imaging module 406 may be configured to receive images that may be used to generate a localized map. In some configurations, the imaging module 406 may be configured to receive videos captured by the camera 300 and to store the received videos in the image dataset 408 or in a similar video database (not shown).

The de-warping module 410 may de-warp the images stored in the image database 408. The de-warping module 410 may de-warp the images so that the images better align with other map data (e.g., vector maps stored in the map database 418). De-warping the images may include distortion correction (e.g., pincushion distortion correction) and chromatic aberration correction. The distortion and/or the chromatic aberration may be due to the lens 312 of the camera 300, a position of the camera 300, a movement of the camera 300, a curvature of the earth, and the like. In some configurations, the de-warping module 410 may de-warp the images at least in part based on the sensor data stored in the sensor database 404. The de-warping module 410 may store the de-warped images in the image database 408.

The altitude determination module 412 may determine an altitude of the camera 300. The altitude of the camera 300 may be a distance between the camera 300 and a surface of the earth. The surface of the earth may be, for example, ground level or sea level. The altitude determination module 412 may determine the altitude of the camera 300 based on the sensor data stored in the sensor database 404. As the camera 300 may be integrated with or coupled to the aerial vehicle 110, in some configurations, the altitude determination module 412 may determine the altitude of the camera 300 based on an altitude of the aerial vehicle 110.

In some configurations, the altitude determination module 412 may determine the altitude of the camera 300 based on one or more input parameters (e.g., a desired camera footprint, desired length and width of the camera foot, and the like). For example, the altitude determination module 412 may determine the altitude of the camera 300 based on a field of view (FOV) of the camera 300 and an aspect ratio of the camera 300. The FOV of the camera 300 is described below with respect to the footprint calculation module 414. The aspect ratio of the camera 300 is a relationship between a length and a width of an image captured by the camera 300. The altitude determination module 412 may further generate instructions for the aerial vehicle 110 to fly to the determined altitude and to capture images.

Figure 5:
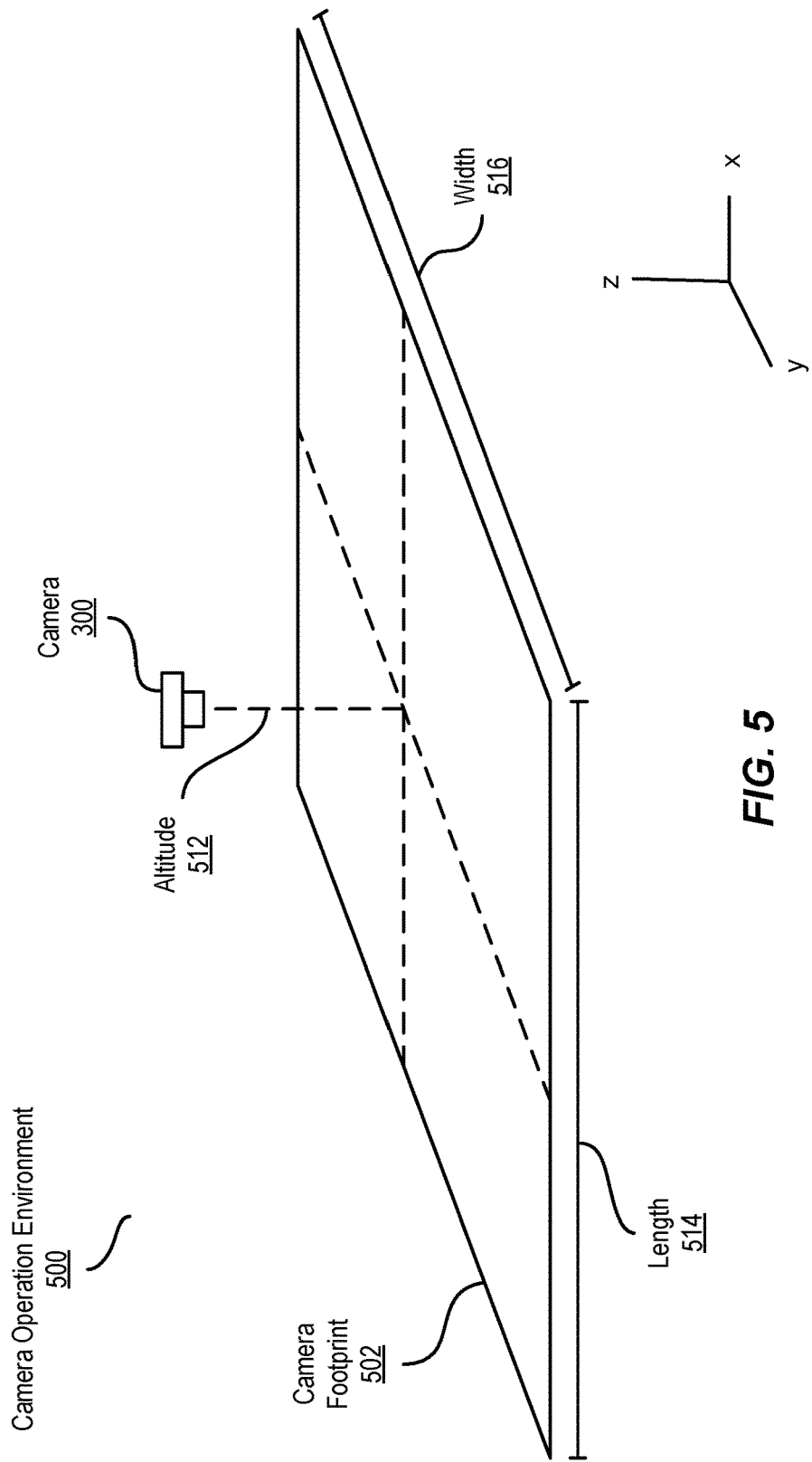
FIG. 5 illustrates an example camera operation environment, according to one example embodiment.

Referring briefly to FIG. 5, it illustrates an example camera operation environment 500, according to one example embodiment. In one example, the altitude determination module 412 may determine the camera 300 is at an altitude 512 based on sensor data from the sensors 340 of the camera 300 and/or from the sensors of the subsystem 235.

Referring back to FIG. 4, the footprint calculation module 414 may calculate a footprint of the camera 300. The camera footprint is the area on the surface of the earth that is captured by the camera 300. The camera footprint may have an associated length and width. The footprint calculation module 414 may calculate the associated length and width based on the altitude of the camera 300 and a field of view (FOV) of the camera 300. The area of the camera footprint may be a product of the associated length and width in a horizontal x-y plane.

The FOV of the camera 300 may be the extent of the earth captured by the camera 300. The FOV may have two components: a horizontal FOV and a vertical FOV. In some configurations, the horizontal FOV and the vertical FOV may be the same (i.e., have the same numerical value) while in other configurations, they may be different. In some configurations, the horizontal FOV and the vertical FOV may be known while in other configurations, they may be calculated. The horizontal FOV and the vertical FOV may be calculated based on a size of the image sensor 316 of the camera 300 and a focal length of the lens 312 of the camera 300.

In some configurations, the footprint calculation module 414 may calculate the camera footprint based on one or more input parameters (e.g., desired area of the camera footprint). The footprint calculation module 414 may further calculate a length and a width of the camera footprint.

Referring briefly back to FIG. 5, the camera operation environment 500 includes a camera footprint 502 having an associated length 514 and width 516. The footprint calculation module 414 may determine the camera footprint 502 of the camera 300 based on the altitude 512 and a FOV of the camera 300. The area of the camera footprint 502 may be a product of the length 514 and the width 516.

Referring back to FIG. 4, the localized mapping module 416 may construct a localized map based on the images stored in the image database 408 and the camera footprint calculated by the footprint calculation module 414. The localized mapping module 416 may include a compass, a scale, a relative position of the aerial vehicle 110, a relative heading of the aerial vehicle, metadata associated with the aerial vehicle (e.g., metadata associated with time of day, date, weather conditions, location, and the like), a relative position of the remote controller 120, a relative heading of the remote controller 120, and the like, on the localized map. The localized mapping module 416 may further include a zone (e.g., a fly zone) in which the aerial vehicle 110 may operate and may include the zone on the localized map. The localized mapping module 416 may include the zone on the localized map in the form of coordinates (e.g., global positioning system (GPS) coordinates) for boundaries and/or markers (e.g., logical characteristics such as marked boundaries on an image or physical characteristics in an image such as trees, buildings, waterways, etc.). The localized mapping module 416 may access the zone from the map database 418. The localized mapping module 416 may store the localized map in the map database 418. The localized map may be used for navigation and/or reference. For example, a user of the aerial vehicle 110 and/or the remote controller 120 may use the localized map.

In some configurations, the map database 418 may additionally store a vector map including vector based geographic information system (GIS) data of the Earth. The vector map may be pre-loaded or downloaded in real time. The vector map may include data regarding, for example, major road networks, railroad networks, major airports, elevation contours, coastlines, boundaries (e.g., local, state, national, international, and the like), index of geographical names, and the like. In some configurations, the localized mapping module 416 may overlay the vector maps on the constructed localized map (or vice versa).

The relative position module 420 may determine a relative position of the aerial vehicle 110 including the camera 300 with respect to an initial position of the aerial vehicle 110 at the time the sensor data and the images used to construct the localized map were captured. The relative position module 420 may determine the relative position of the aerial vehicle 110 based on a change in the sensor data received by the sensor data receiver module 402. The relative position module 420 may provide the user of the aerial vehicle 110 and/or the remote controller 120. In some configurations, the relative position module 420 may further display the relative position of the aerial vehicle 110 on the localized map constructed by the localized mapping module 416 and stored in the map database 418.

Example Camera Footprint Determination

The footprint calculation module 414 may calculate the length of the camera footprint ($CFP_L$) based on a product of the altitude of the camera 300 (A) and the horizontal FOV of the camera 300 ($FOV_H$). Equation 1 represents a general form of the $CFP_L$.

$$CFP_L = f(A \cdot FOV_H) \quad \text{Equation 1}$$

Specifically, $CFP_L$ is a function of a product of A, a function of a tangent of $FOV_H$, and a constant, 2. Equation 2 represents $CFP_L$ in this manner.

$$CFP_L = f(A \cdot f(\tan(FOV_H) \cdot 2)) \quad \text{Equation 2}$$

The function of the tangent of $FOV_H$ can be expressed as a quotient of $FOV_H$ and a constant, 2. Equation 3 represents the length of $CFP_L$ in this manner.

$$CFP_L = A \cdot \left(\tan\left(\frac{FOV_H}{2}\right)\right) \cdot 2 \quad \text{Equation 3}$$

Similarly, the footprint calculation module 414 may calculate the width of the camera footprint ($CFP_W$) based on a product the altitude of the camera 300 (A) and the vertical FOV of the camera 300 ($FOV_V$). Equation 4 represents a general form of the width of $CFP_W$.

$$CFP_W = f(A \cdot FOV_V) \quad \text{Equation 4}$$

Specifically, $CFP_W$ is a function of a product of A, a function of a tangent of $FOV_V$, and a constant, 2. Equation 5 represents $CFP_W$ in this manner.

$$CFP_W = f(A \cdot f(\tan(FOV_V) \cdot 2)) \quad \text{Equation 5}$$

The function of the tangent of $FOV_V$ can be expressed as a quotient of $FOV_V$ and a constant, 2. Equation 6 represents the $CFP_W$ in this manner.

$$CFP_W = A \cdot \left(\tan\left(\frac{FOV_V}{2}\right)\right) \cdot 2 \quad \text{Equation 6}$$

In this manner, the footprint calculation module 414 may calculate the length and width of the camera footprint based on the altitude of the camera 300 and the horizontal FOV and the vertical FOV, respectively.

Figure 6A:
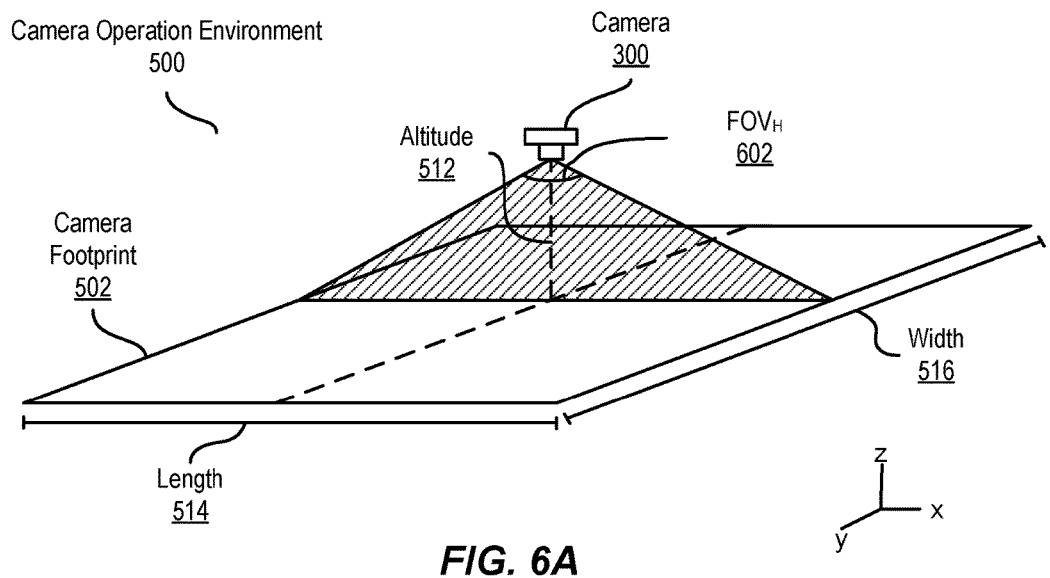
FIG. 6A illustrates an example camera operation environment including a horizontal field of view of a camera, according to one example embodiment.

FIG. 6A illustrates the camera operation environment 500 of FIG. 5 including a horizontal FOV ($FOV_H$) 602 of the camera 300, according to one example embodiment. The footprint calculation module 414 may determine the length 514 of the camera footprint 502 based on the altitude 512 and the $FOV_H$ 602.

Figure 6B:
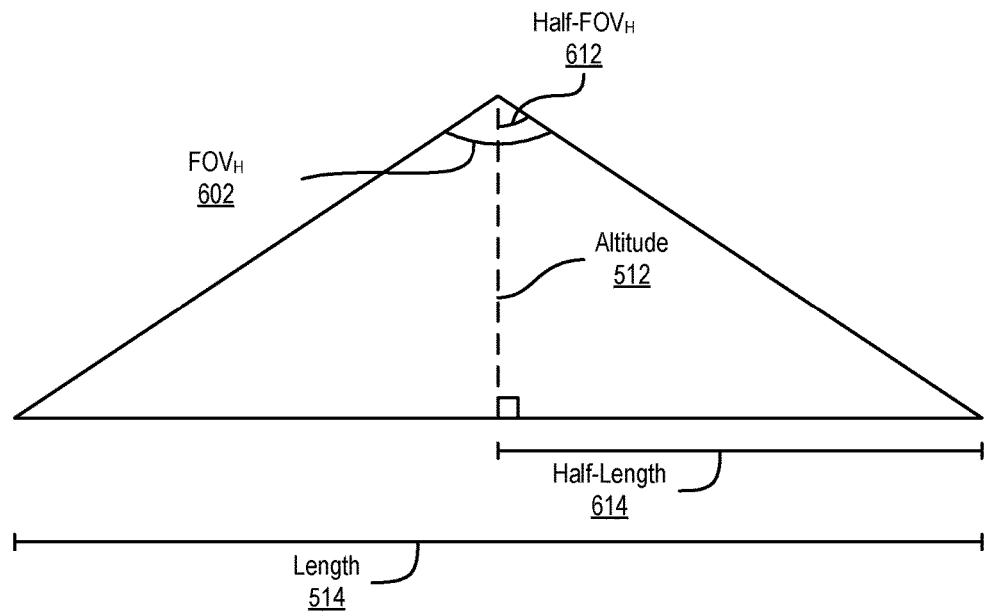
FIG. 6B illustrates a cross section view of the example camera operation environment of FIG. 6A, according to one example embodiment.

FIG. 6B illustrates a cross section view of the camera operation environment 500 of FIG. 6A, according to one example embodiment. Half-$FOV_H$ 612 represents half of the horizontal FOV (i.e. $FOV_H/2$) and half-length 614 represents half of the length 514 (i.e. length/2).

Equation 7 represents a relationship between the half-$FOV_H$ 612 ($FOV_H/2$), the altitude 512 (A), and the half-length 614 (length/2).

$$\tan\left(\frac{FOV_H}{2}\right) = \frac{\text{length}/2}{A} \quad \text{Equation 7}$$

Equation 8 represents equation 7 solved for length.

$$\text{length} = A \cdot \left(\tan\left(\frac{FOV_H}{2}\right)\right) \cdot 2 \quad \text{Equation 8}$$

Figure 7A:
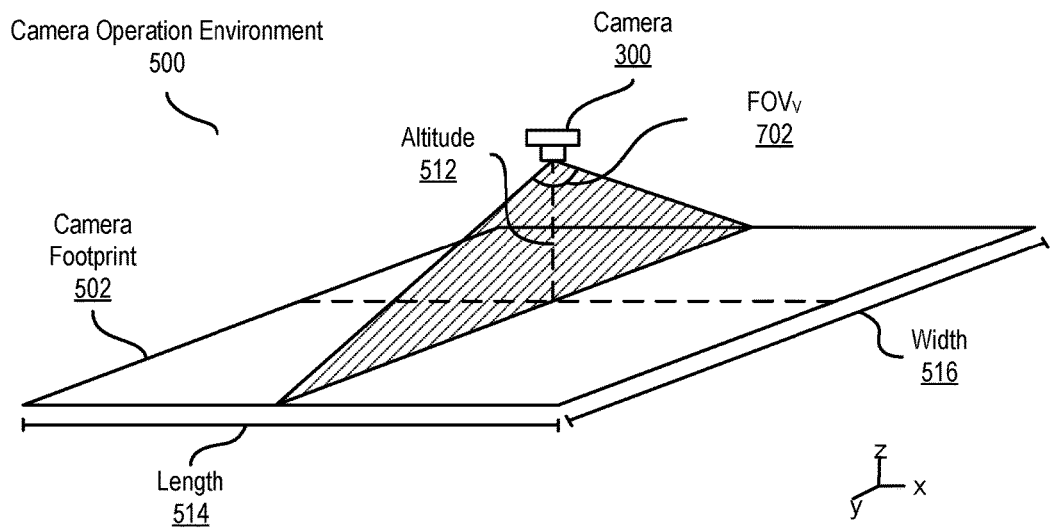
FIG. 7A illustrates an example camera operation environment including a vertical field of view of a camera, according to one example embodiment.

Similarly, FIG. 7A illustrates the camera operation environment 500 of FIG. 5 including a vertical FOV ($FOV_V$) 702 of the camera 300, according to one example embodiment. The footprint calculation module 414 may determine the width 516 of the camera footprint 502 based on the altitude 512 and the $FOV_V$ 702.

Figure 7B:
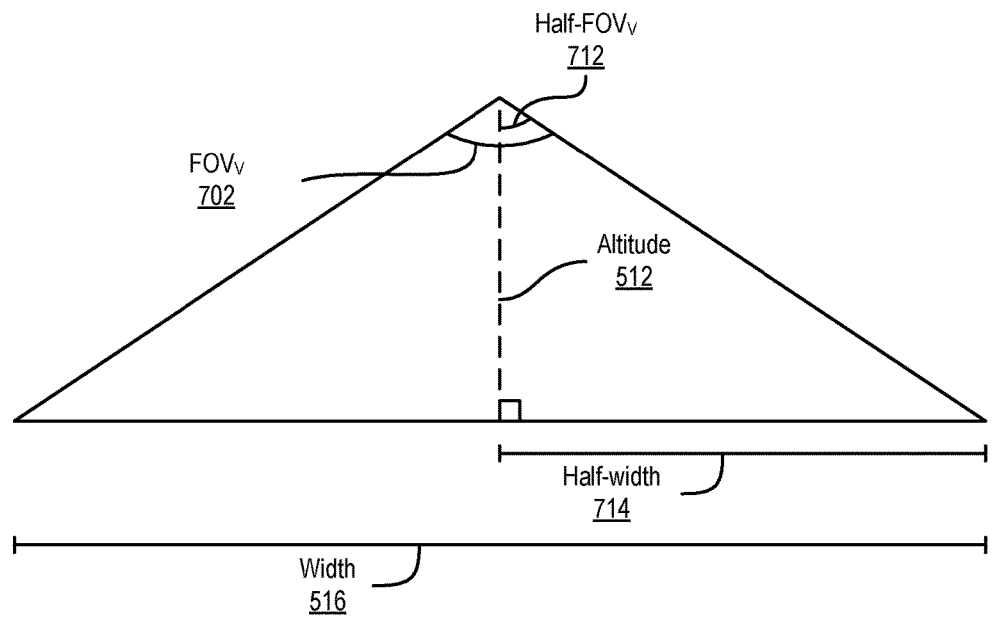
FIG. 7B illustrates a cross section view of the example camera operation environment of FIG. 7A, according to one example embodiment.

FIG. 7B illustrates a cross section view of the camera operation environment 500 of FIG. 7A, according to one example embodiment. Half-$FOV_V$ 712 represents half of the vertical FOV (i.e., $FOV_V/2$) and half-width 714 represents half of the width 516 (i.e., width/2).

Equation 9 represents a relationship between the half-$FOV_V$ 712 ($FOV_V/2$), the altitude 512 (A), and the half-width 714 (width/2).

$$\tan\left(\frac{FOV_V}{2}\right) = \frac{\text{width}/2}{A} \quad \text{Equation 9}$$

Equation 10 represents equation 9 solved for width.

$$\text{width} = A \cdot \left(\tan\left(\frac{FOV_V}{2}\right)\right) \cdot 2 \quad \text{Equation 10}$$

In some configurations, the footprint calculation module 414 may calculate the length of the camera footprint ($CFP_L$) and the width of the camera footprint ($CFP_W$) based on one or more input parameters (e.g., desired area of the camera footprint). The altitude determination module 412 may determine the altitude of the camera 300 by solving for the altitude A in Equation 3 or 6. In these configurations, the altitude determination module 412 may determine the altitude of the camera 300 based on the length of the camera footprint ($CFP_L$) and/or the width of the camera footprint ($CFP_W$) and the horizontal FOV ($FOV_H$) and/or the vertical FOV ($FOV_V$) of the camera 300. In some configurations, the altitude determination module 412 may determine the altitude of the camera 300 based on the FOV of the camera 300 and the aspect ratio of the camera 300.

Example Localized Map Construction

Figure 8:
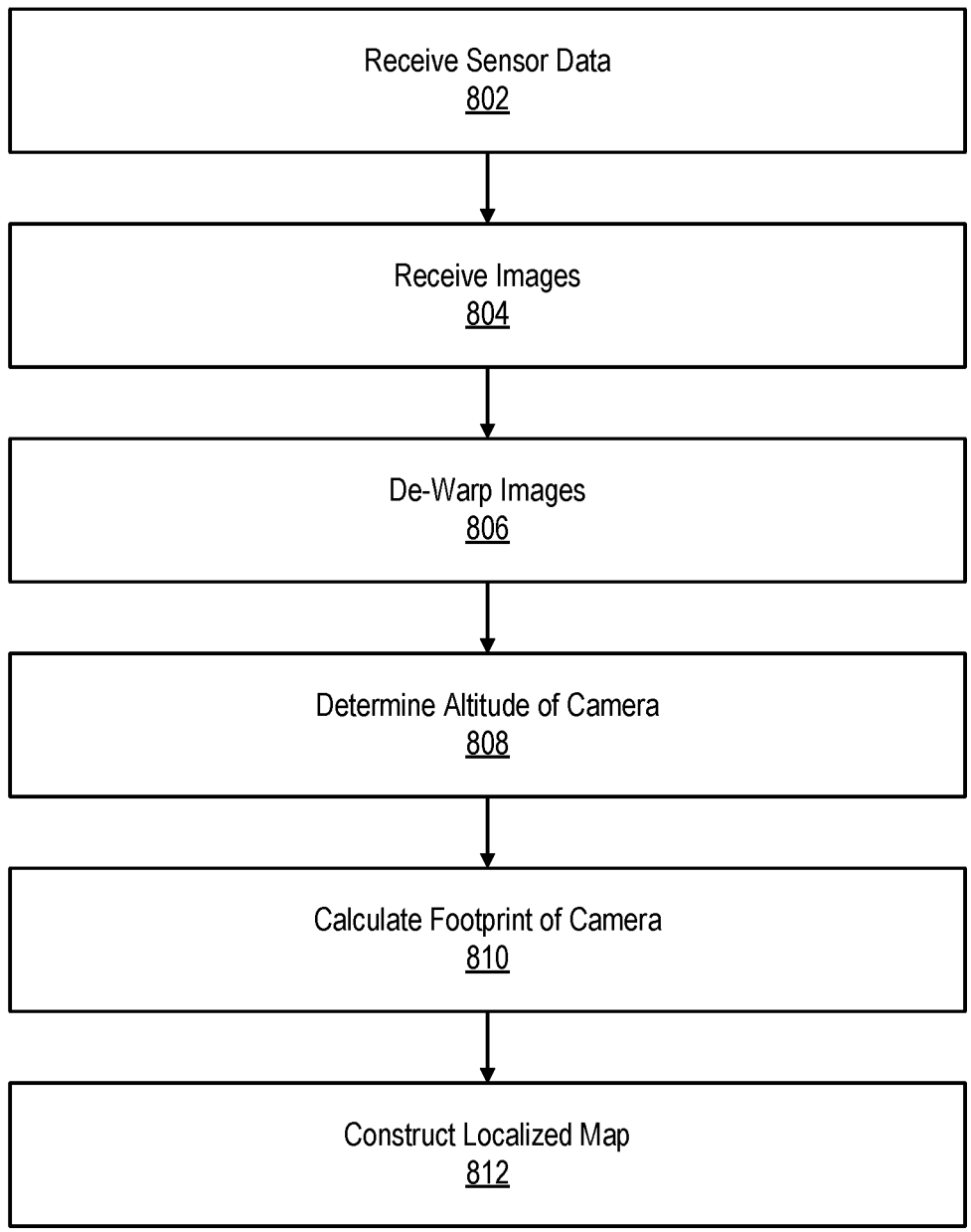
FIG. 8 is a flowchart illustrating a method of constructing a localized map, according to one example embodiment.

FIG. 8 is a flowchart illustrating a method of constructing a localized map, according to one example embodiment.

The sensor data receiver module 402 receives 802 sensor data from the sensors 340 of the camera 300 and/or from the sensors of the sensor subsystem 235 and stores the received sensor data in the sensor database 404. The sensor data may include, for example, global positional system (GPS) data and barometric data. The imaging module 406 receives 804 images captured by the camera 300 and stores the received images in the image database 408. The de-warping module 410 de-warps 806 the images stored in the image database 408. De-warping 806 the images may include distortion correction and chromatic aberration correction. The altitude determination module 412 determines 808 an altitude of the camera 300 based on the sensor data stored in the sensor database 404. The altitude of the camera may be a distance between the camera 300 and a surface of the earth. The footprint calculation module 414 calculates 810 a footprint of the camera 300 based on the altitude of the camera 300 determined by the altitude determination module 412 and a field of view (FOV) of the camera 300. The FOV of the camera 300 may be the extent of the earth captured by the camera 300. The localized mapping module 416 constructs 812 a localized map based on the images stored in the image database 408 and the camera footprint calculated by the footprint calculation module 414 and stores the localized map in the map database 418.

The sequence of steps as described above with reference to FIG. 8 is merely illustrative. For example, although calculating 810 the footprint of the camera 300 and determining 808 the altitude of the camera 300 are described above as occurring after receiving 802 the sensor data and receiving 804 the images, the footprint of the camera 300 may be calculated 810 and the altitude of the camera 300 may be determined 808 before receiving 802 the sensor data and before receiving 804 the images. In this example, the footprint calculation module 414 may calculate 810 a footprint of the camera 300 based on one or more input parameters (e.g., desired area of the camera footprint). The footprint calculation module 414 may further calculate a length and a width of the camera footprint. The altitude determination module 412 may determine 808 an altitude of the camera 300 based on the calculated camera footprint, for example based on the length and the width. The altitude determination module 412 may determine 808 the altitude of the camera 300 by solving for the altitude A in Equations 3 and 6. The altitude determination module 412 may further generate instructions for the aerial vehicle 110 to fly to the determined altitude and to capture images. The sensor data receiver module 402 may receive 402 sensor data from the sensors 340 of the camera and/or from the sensor subsystem 235. The imaging module 406 may receive 804 images captures by the camera 300 according to the instructions generated by the altitude determination module 412. The localized mapping module 416 may construct 812 a localized map based on the images received by the imaging module 406.

Example Machine Architecture

As has been noted, the remote controlled aerial vehicle 110 can be remotely controlled from the remote controller 120. The aerial vehicle 110 and the remote controller 120 are machines that that be configured operated using software. FIG. 9 is a block diagram illustrating components of an example machine able to read instructions from a machine-readable medium and execute them in one or more processors (or controllers). All or portions of the example machine described in FIG. 9 can be used with the aerial vehicle 110 or the remote controller 120 and/or other parts of a system that interfaces with the aerial vehicle 110 and/or remote controller 120. For example, the mapping system 380 of the camera 300 may be may be a machine/computer system similar to the example machine illustrated in FIG. 9.

In FIG. 9 there is a diagrammatic representation of a machine in the example form of a computer system 900. The computer system 900 can be used to execute instructions 924 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine in this example is a handheld controller to control the remote controlled aerial vehicle. However, the architecture described may be applicable to other computer systems that operate in the system of the remote controlled aerial vehicle with camera and mounting configuration (e.g., in setting up a local positioning system). These other example computer systems include a server computer, a client computer, a personal computer (PC), a tablet PC, a smartphone, an internet of things (IoT) appliance, a network router, switch or bridge, or any machine capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processing units (generally processor 902). The processor 902 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 900 also includes a main memory 904. The computer system may include a storage unit 916. The processor 902, memory 904 and the storage unit 916 communicate via a bus 908.

In addition, the computer system 900 can include a static memory 906 and a screen driver 910 (e.g., to drive screen, e.g., 170, such as a plasma display panel (PDP), a liquid crystal display (LCD), or a projector). The computer system 900 may also include input/output devices, e.g., an alpha-numeric input device 912 (e.g., a keyboard), a dimensional (e.g., 2-D or 3-D) control device 914 (e.g., a mouse, a trackball, a joystick, a motion sensor, or other pointing instrument), a signal generation device 918 (e.g., a speaker), and a network interface device 920, which also are configured to communicate via the bus 908.

The storage unit 916 includes a machine-readable medium 922 on which is stored instructions 924 (e.g., software) embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting machine-readable media. The instructions 924 may be transmitted or received over a network 926 via the network interface device 920.

While machine-readable medium 922 is shown in an example embodiment to be a single medium, the term "machine-readable medium" should be taken to include a single medium or multiple media (e.g., a centralized or distributed database, or associated caches and servers) able to store the instructions 924. The term "machine-readable medium" shall also be taken to include any medium that is capable of storing instructions 924 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The disclosed configuration may include a camera 300 that may have, or may be coupled with, a mapping system 380 to generate a localized map based on image data and sensor data. Generating a localized map based on image data and sensor data may be advantageous in situations in which the aerial vehicle 110 may not be able to pre-load or download geographic maps in real-time. Such situations may arise in if the aerial vehicle 110 does not have a data connection, if the aerial vehicle 110 does not have ample memory to store all geographic maps, and the like. In these situations, the mapping system 380 may generate a localized map and provide the generated localized map to a user of the aerial vehicle 110 for use during operation/flight.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 902, that are temporarily configured (e.g., by software (or program code)) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment," "one example embodiment," or "an embodiment" means that a particular element, feature, structure, or characteristic described in connection with the embodiment is included in at least one embodiment. The appearances of the phrase "in one embodiment" and "in one example embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional or alternative methods of constructing a localize map through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method comprising:
   receiving sensor data from an unmanned aerial vehicle;
   receiving images from a camera on the unmanned aerial vehicle;
   determining an altitude of the camera based on the sensor data;
   calculating a footprint of the camera based on the altitude of the camera and a field of view (FOV) of the camera;
   constructing a localized map based on the images and the footprint of the camera; and
   overlaying the localized map on a vector map, the vector map including any of road networks, railroad networks, airports, elevation contours, coastlines, boundaries, and index of geographical names.

2. The computer implemented method of claim 1, wherein the sensor data comprises global positioning system data and barometric data.

3. The computer implemented method of claim 1, wherein the altitude of the camera is a distance between the camera and a surface of earth.

4. The computer implemented method of claim 1, wherein the FOV of the camera is an extent of the earth captured by the camera.

5. The computer implemented method of claim 1, wherein the FOV of the camera comprises a horizontal component and a vertical component.

6. The computer implemented method of claim 5, wherein determining the footprint of the camera comprises:
   determining a length of the footprint of the camera based on the horizontal component of the FOV of the camera and the altitude of the camera; and
   determining a width of the footprint of the camera based on the vertical component of the FOV of the camera and the altitude of the camera.

7. The computer implemented method of claim 1, further comprising de-warping the images.

8. The computer implemented method of claim 7, wherein de-warping the images comprises at least one of distortion correction and chromatic aberration correction.

9. The computer implemented method of claim 1, further comprising determining a position of the camera relative to an initial position of the camera, wherein the initial position is associated with the sensor data used to determine the altitude of the camera and the images used to construct the localized map.

10. A non-transitory computer-readable storage medium comprising stored instructions, the instructions that, when executed, causes at least one processor to:
    receive sensor data from an unmanned aerial vehicle;
    receive images from a camera on the unmanned aerial vehicle;
    determine an altitude of the camera based on the sensor data;
    calculate a footprint of the camera based on the altitude of the camera and a field of view (FOV) of the camera;
    construct a localized map based on the images and the footprint of the camera; and
    overlay the localized map on a vector map, the vector map including any of road networks, railroad networks, airports, elevation contours, coastlines, boundaries, and index of geographical names.

11. The non-transitory computer-readable storage medium of claim 10, wherein the sensor data comprises global positioning system data and barometric data.

12. The non-transitory computer-readable storage medium of claim 10, wherein the altitude of the camera is a distance between the camera and a surface of earth.

13. The non-transitory computer-readable storage medium of claim 10, wherein the FOV of the camera is an extent of the earth captured by the camera.

14. The non-transitory computer-readable storage medium of claim 10, wherein the FOV of the camera comprises a horizontal component and a vertical component.

15. The non-transitory computer-readable storage medium of claim 14, wherein the instructions to calculate the footprint of the camera further comprises instructions that, when executed, causes the processor to:
    determine a length of the footprint of the camera based on the horizontal component of the FOV of the camera and the altitude of the camera; and
    determine a width of the footprint of the camera based on the vertical component of the FOV of the camera and the altitude of the camera.

16. The non-transitory computer-readable storage medium of claim 10, further comprising instructions that, when executed, causes the processor to de-warp the images.

17. The non-transitory computer-readable storage medium of claim 16, wherein the instructions to de-warp the images further comprises instructions that, when executed, cause the processor to at least one of correct distortion and correct chromatic aberration.

18. The non-transitory computer-readable storage medium of claim 10, further comprising instructions that, when executed, causes the processor to determine a position of the camera relative to an initial position of the camera, wherein the initial position is associated with the sensor data used to determine the altitude of the camera and the images used to construct the localized map.

* * * * *